United States Patent [19]

Argabright et al.

[11] Patent Number: 4,580,627

[45] Date of Patent: Apr. 8, 1986

[54] OIL RECOVERY PROCESS AND SYSTEM

[75] Inventors: Perry A. Argabright, Larkspur; John S. Rhudy, Littleton, both of Colo.

[73] Assignee: Marathon Oil Company, Findlay, Ohio

[21] Appl. No.: 533,112

[22] Filed: Sep. 19, 1983

Related U.S. Application Data

[62] Division of Ser. No. 275,594, Jun. 19, 1981, Pat. No. 4,433,727.

[51] Int. Cl.$^4$ .............................................. E21B 43/22
[52] U.S. Cl. ...................... 166/79; 166/275; 166/75.1; 524/555; 524/827; 525/329.4
[58] Field of Search ............... 166/75 R, 57, 79, 91, 166/273, 274, 275, 305 R; 252/8.55 D; 524/555, 827; 525/329.4

[56] References Cited

U.S. PATENT DOCUMENTS

| | | | |
|---|---|---|---|
| 2,827,964 | 3/1958 | Sandiford et al. | 166/275 X |
| 3,039,529 | 6/1962 | McKennon | 166/275 |
| 3,370,649 | 2/1968 | Wolgemuth | 166/274 |
| 3,476,186 | 11/1969 | Sarem | 166/275 X |
| 3,663,490 | 5/1972 | Sarem | 524/555 |
| 3,679,000 | 7/1972 | Kaufman | 166/273 |
| 3,825,067 | 7/1974 | Vestal | 166/274 X |
| 3,902,558 | 9/1975 | Watson, Jr. | 166/75 X |
| 4,021,394 | 5/1977 | Tuka et al. | 524/555 X |
| 4,383,930 | 5/1983 | Argabright et al. | 166/275 X |

*Primary Examiner*—George A. Suchfield
*Attorney, Agent, or Firm*—Jack L. Hummel; Rodney F. Brown

[57] ABSTRACT

An on-site, in-line process and system for recovering oil from oil-bearing subterranean formations which involves the production, modification, dilution and injection of a polymer solution, preferably consisting essentially of an aqueous solution of a partially hydrolyzed polyacrylamide, having injectivity and mobility properties capable of meeting the specific permeability requirements of substantially any subterranean formation to be achieved. The polymer solutions prepared by the process and system can be used as drive fluids for displacing oil (secondary polymer flood) in an oil-bearing formation, as mobility buffers to follow micellar dispersion floods in the conjoint presence of chemical reagents in other chemical floods (e.g., surfactant, caustic, etc.), or they can follow a water flood. The solutions can also be used to promote pipelining of high viscosity crude oil. Irrespective of the use to which the solutions are put, the process and system enable the polymer solutions to be customized, or tail-made, so to speak, to meet the performance demands of the environment in which they are to be used, whether it be an oil-bearing formation or a pipeline.

5 Claims, 8 Drawing Figures

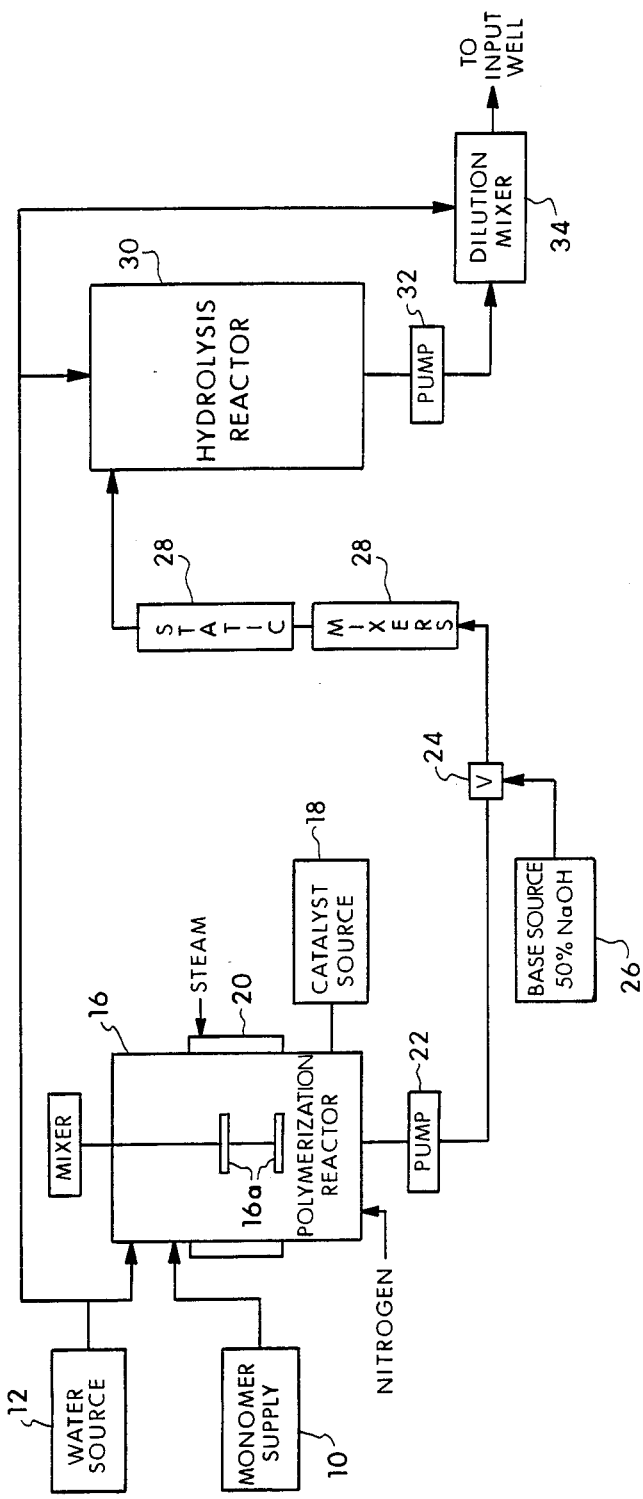

OIL RECOVERY PROCESS AND SYSTEM

This is a division of application Ser. No. 275,594, filed June 19, 1981, now U.S. Pat. No. 4,433,727.

TECHNICAL FIELD

The present invention relates to a process and system for recovering oil from oil-bearing subterranean formations or reservoirs, and, in particular, to a process and system wherein a drive fluid, or mobility buffer, preferably in the form of an aqueous solution of a polymer such as a partially hydrolyzed polyacrylamide is employed in the secondary and tertiary recovery of oil from such formations or reservoirs.

BACKGROUND OF PRIOR ART

The recovery of residual oil from oil-bearing subterranean formations by flooding of the formation with an aqueous medium containing a polymer such as a partially hydrolyzed polyacrylamide has received widespread attention as evidenced by the substantial number of U.S. patents directed to the preparation and use of such solutions. Included among this large group of patents are U.S. Pat. Nos. 2,827,964, 3,002,960, 3,039,529, 3,370,649, 3,558,759, 3,800,877, 8,825,067, 3,841,401, and 3,853,802. At least one of the aforementioned patents, namely, U.S. Pat. No. 3,370,649, suggests the preparation and injection of an aqueous soution of a partially hydrolyzed polyacrylamide at the site of the oil-bearing formation. In accordance with the teaching of that patent, polymerization and hydrolysis are carried out simultaneously in the presence of an alkali metal polyphosphonate and a suitable catalyst for a time sufficient to effect hydrolysis of from 5 to about 70 percent of the amide groups of the polymer. The resulting aqueous solution of the partially hydrolyzed polyacrylamide is then mixed with water, and injected into an input well penetrating a subterranean oil-bearing formation, and forced through the formation in the direction of one or more output wells penetrating the formation. The random, haphazard, all-in-one-pot production approach disclosed in the patent not only is inefficient and wasteful, and, therefore, economically unfeasible, but, also, and perhaps more importantly, yields an end product having properties which are unpredictable, and which, except by fortuitous happenstance, are incapable of meeting the specific permeability requirements of a subterranean oil-bearing formation of interest. More specifically in this latter connection, the process of U.S. Pat. No. 3,370,649 does not enable the controlled production of an aqueous solution of a polymer for use in an oil-bearing formation having the necessary injectivity and mobility properties both at the input well to prevent, or substantially reduce, wellbore plugging, and, away from the input well, that is, the matrix, to enable adequate displacement of oil in the formation in the direction of an output well to take place. Nor, moreover, does U.S. Pat. No. 3,370,649, or any of the other aforementioned United States patents for that matter, suggest a system or process for accomplishing such a result.

BRIEF SUMMARY OF INVENTION

In accordance with the present invention, a process and system have been evolved for the production of aqueous polymer solutions for use in recovering oil from subterranean oil-bearing formations which are capable of meeting the performance demands of substantially any subterranean oil-bearing formation. The process and system not only enable the production of polymer solutions having uniform and predictable properties, but, also, enable the production of polymer solutions having superior properties, especially from the standpoint of their improved injectivity and mobility, their stability, their brine tolerance, and their resistance to degradation or thinning by shear forces. What is more, these results are achieved with greater efficiency at a lesser cost than is possible with commercially available polymer products whether they are sold in solid form or in the form of aqueous solutions.

The process and system of the present invention are adapted for on-site, in-line, essentially continuous use thereby eliminating the need for purifying and storing the finished polymer solutions. To this end, the apparatus comprising the system advantageously may be pre-assembled and mounted on skids, for example, for ready transport to and from a site where it is to be used. In its preferred embodiment, the system includes monomer supply means, means for connecting the system to a source of water, polymerization means, catalyst feed and monitoring means, hydrolyzation means including means for feeding a controlled amount of a hydrolyzing agent into the polymer stream, and means for diluting the hydrolyzed polymer and injecting it into an input well penetrating a reservoir of interest. The system further desirably includes water treatment means, and means for introducing reaction control agents such as oxygen, heat, inert gas, and polymerization accelerators into the system. The capability of the process and system for customizing, or tailor-making, a polymer solution which can meet the performance demands of a reservoir of interest is centered upon making a determination of the average molecular weight and the molecular weight distribution of a polymer produced by the process and system. These measurements can be quantitatively correlated with the injectivity characteristics, the mobility behavior, and the overall properties of the polymer. As a result, a broad spectrum of polymers of varying molecular weights can be prepared to meet the permeability demands of substantially any oil-bearing formation being worked. An important adjunct of the average molecular weight and molecular weight distribution measurements is a unique disc flooding technique which enables the injectivity and mobility properties of a polymer needed to achieve optimum displacement of oil from a formation to be predetermined. Once this determinaton has been made, the parameters of the process and system can be changed to produce a polymer having the desired properties.

As stated, the process and system are especially useful for the displacement recovery of petroleum from oil-bearing formations. Such recovery encompasses methods in which the oil is removed from an oil-bearing formation through the action of a displacement fluid or a gas. Thus, the recovery may be secondary, where the reservoir hydrocarbons have been substantially depleted by primary recovery mechanisms, or it may be tertiary, where the polymer solution is injected after injection of conventionally used displacement fluids. Other uses for the polymer solutions prepared by the process and system of the invention include near wellbore injection treatments, and injection along interiors of pipelines to promote pipelining of high viscosity crude oil. The solutions can also be used as hydraulic fracture fluid additives, fluid diversion chemicals, and loss circulation additives, to mention a few.

The foregoing, and other features and advantages of the invention will become clear from the description to follow, taken in conjunction with the accompanying drawings, wherein:

BRIEF DESCRIPTION OF DRAWINGS

FIG. 1 is a schematic representation of an embodiment of a system for preparing polymer based drive fluids by the process of the present invention;

DETAILED DESCRIPTION OF INVENTION

Figure 3:
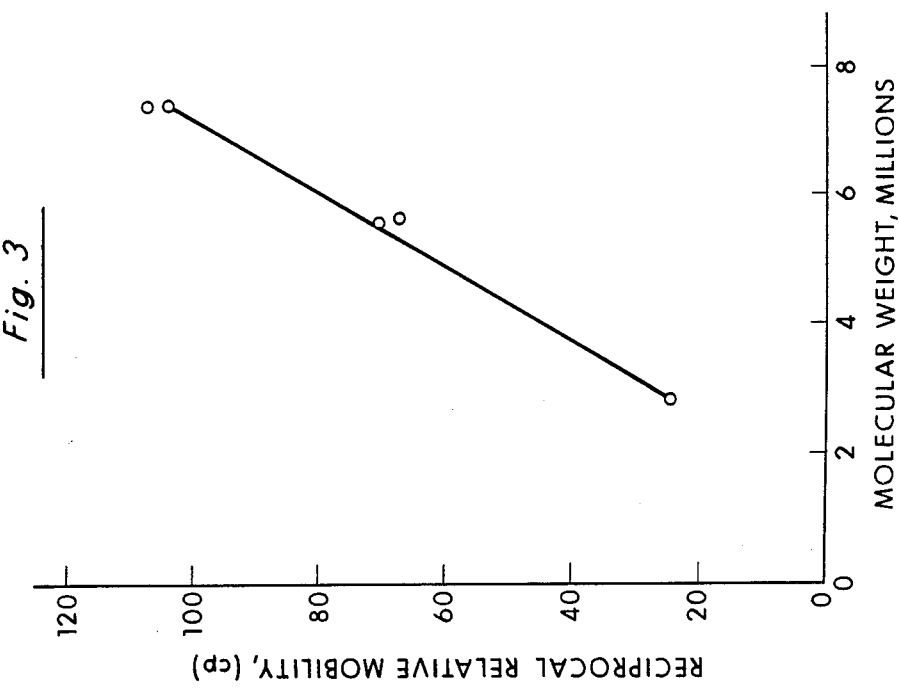
FIG. 3 is a graphical representation showing the linear relationship between the reciprocal relative mobility and the average molecular weight of a polymer prepared in accordance with this invention.

While the process and system of the present invention can be adapted for the production of various polymers for use in preparing aqueous solutions to be employed as drive fluids, or mobility buffers, in the recovery of oil from oil-bearing subterranean formations, in accordance with the preferrred practice of the invention, the polymers are prepared from a water soluble monomer containing at least one vinyl grouping wherein the vinyl group is an acrylyl vinyl, a vinyl cyanide, a styryl vinyl, or a water soluble salt thereof. When the vinyl grouping is an acrylyl vinyl, the monomer may be represented by the formula:

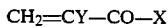

wherein X is hydrogen, an amino group ($NH_2$), hydroxy, methyl or an OR group, wherein R is a lower alkyl radical, and wherein Y is hydrogen or a methyl group. Exemplary of monomers having utility in the practice of the invention are acrylamide, acrylic acid, acrylonitrile, methacrylic acid, methacrylamide, methacrylonitrile, methyl methacrylate and sodium styrenesulfonate. Of this group, acrylamide is the preferred monomer. The acrylamide can be any of various commercially available polymerization grade acrylamides sold in solid form, or in the form of aqueous solutions. From the standpoint of safety considerations, the aqueous solutions are preferred because they eliminate the dust problems which characterize the solid form of the monomer.

The polymerization of the monomer is carried out in the presence of a suitable vinyl polymerization initiator or catalyst. Especially useful are free radical forming compounds such as the azo compounds exemplified by azobisisobutyranitrile and azobisisobutyamidine chloride; peroxides such as hydrogen peroxide, sodium peroxide and benzoyl peroxide; alkyl and dialkyl peroxides such as, for example, t-butyl hydrogen peroxides and diethyl peroxide; alkali metal, including ammonium, persulfates such as sodium persulfate, potassium persulfate and ammonium persulfate; and alkali metal bisulfites exemplified by sodium bisulfite and potassium bisulfite. Where the monomer to be polymerized is acrylamide, ammonium persulfate and sodium bisulfite, especially co-mixtures thereof employed in a ratio of about 9:1 to about 1:9, are preferred as the catalysts or free radical initiators. The rate of polymerization of acrylamide monomer using a co-mixture of ammonium persulfate and sodium bisulfite can be accelerated by replacing a portion of the sodium bisulfite with a ferrous compound such as ferrous ammonium sulfate. Excellent results are obtained in a tricatalyst system of this type where from about 20 to about 40, preferably about 30 to about 35, mole percent of the sodium bisulfite is replaced by the ferrous compound. As shall be discussed in greater detail below, the concentration of the free radical initiator or catalyst used in the polymerization step of the process of this invention plays an important role in providing an aqueous polymer solution capable of meeting the performance demands of a specific oil-bearing subterranean formation.

In accordance with one aspect of the invention, the performance capabilities of acrylamide polymers produced by the process have been enhanced by carrying out the polymerization in the presence of certain organic polycarboxylic acids exemplified by ethylenediaminetetraacetic acid, N-(2 hydroxyethyl)-ethylenediaminetetraacetic acid, and nitrilotriacetic acid. Thus, by way of illustration, in the polymerization of acrylamide, the addition of from about 250 to about 350 ppm of ethylenediaminetetraacetic acid to the reaction mixture provided a polymer having superior performance in core floods.

It is noteworthy that the process of the present invention utilizes oxygen to initially inhibit polymerization of the monomer and, yet, enables the polymerization to be carried out in the presence of oxygen, although in a concentration less than that when it is used as an inhibitor. The oxygen can be pure oxygen. Preferably, however, air is employed as the oxygen source. The oxygen desirably is introduced into the reaction mixture by bubbling it into the mixture until saturation is reached. At ambient temperatures, in a reaction mixture comprising a water solution of acrylamide wherein the concentration of the acrylamide is of the order of from about 1 to about 8 weight percent, oxygen saturation is reached at about 3 to about 10 ppm, usually about 4 to about 6 ppm by weight of oxygen. At this concentration, the oxygen acts as a polymerization inhibitor. After the concentration of the oxygen has been reduced to about 0.1 to about 0.2 ppm, as by sparging with an inert gas, vacuum degassing, or by introducing an oxygen scavenger, such as sodium bisulfite, or a combination thereof, polymerization of the monomer proceeds.

In general, it is preferred to use tap water in the process. The advantage in using tap water is that it has a low salt level, and the pH of the water is in the range of 8-10 which favors the polymerization reaction. While tap water is preferred, it is possible to use a range of waters from deionized to connate (natural reservoir water).

The temperature at which the polymerization is conducted is somewhat variable. In the polymerization of acrylamide, for example, the temperature of the reaction mixture desirably should be in the range of from about 30° C. to about 80° C., preferably from about 40° C. to about 55° C. Boiling should be avoided. Polymerization times, likewise, are variable. Again, using acrylamide as the monomer, polymerization of the monomer is permitted to proceed for a period of from 8-12, usually about 9-10 hours. The polymerization reaction is exothermic, and the reaction mixture, after the initial reaction period, is stirred at the terminal exotherm temperature of the mixture for an added 1 to 4, generally 2 to 3, hours.

When polymerization is completed, an amount of a monovalent base such as sodium or potassium hydroxide is added to the polymer to hydrolyze from about 20 to about 40 mole percent of the amide groups in the case of a polymer such as polyacrylamide, or ester groups, in the case of a polymer such as polymethylmethacrylate. Where the polymer is polyacrylamide, the generally optimum objectives of the invention from the standpoint of injectivity and mobility control, and overall performance capabilities, are attained with a partially hydrolyzed polyacrylamide in which from about 25 to about 35, especially desirably about 30 mole percent, of the amide groups have been converted to carboxylate groups.

As indicated, one of the important aspects of this invention is the ability to provide, at the point of use, an aqueous polymer solution customized, or tailor-made, to meet the demands of any particular oil-bearing subterranean formation. To this end, a system, the components of which may be mounted in a manner to enable them to be easily transported to a preselected site, has been evolved. An embodiment of such a system is schematically represented in FIG. 1 of the drawings. As shown, the system essentially comprises monomer supply means 10 and a source of water 12 in communication with a polymerization reactor or vessel 16. A catalyst source 18 also advantageously is in communication with the vessel 16. The catalyst source 18 desirably comprises means for holding, separately, each component of a cocatalyst, and means for metering a predetermined amount of each component of the cocatalyst separately, or together, into the vessel 16. The catalyst source 18 and its associated metering means (not shown) are important features of the system in that through proper adjustment of the concentration of the catalyst, or cocatalyst, in the vessel 16 the average molecular weight and the molecular weight distribution of the polymer formed in the vessel 16 can be altered as desired to provide a polymer having the injectivity and mobility properties capable of meeting the performance demands of a reservoir of interest. The vessel 16 desirably has a stirrer or mixer 16a, and is provided with a steam jacket 20 for heating the reaction mixture in the vessel. The vessel 16 has provision for introducing nitrogen or other inert gas into the vessel 16 for removing, or substantially reducing, the concentration of oxygen in the reaction mixture. A pump 22, having its inlet end in communication with the vessel 16, and its outlet end in commuication with a mixing valve 24 is provided for removing the formed polymer from the vessel 16 and into contact with an aqueous base solution from a source 26 thereof also in communication with the valve 24. The mixing valve 24 is connected by a line to mixing means which, in the embodiment of the system illustrated, comprises static mixers 28. The static mixers 28, as shown, in turn, are in communication with a hydrolysis reactor or vessel 30 where dilution of the formed polymer occurs. A pump 32 is connected to the vessel 30 for removing the diluted polymer and transferring it to a final dilution mixer or unit 34. The diluted polymer solution formed in the unit 34 is ready for injection into an input well. The system desirably may incorporate auxiliary equipment (not shown) including a monomer chelating and weighing tank, a source of a polymerization accelerator such as ethylenediamineacetic acid, water demineralizing means, ion exchange means for removal of $Cu^{++}$ from the monomer solution, and a scrubber for the water introduced at the final polymer dilution stage of the system.

Figure 2:
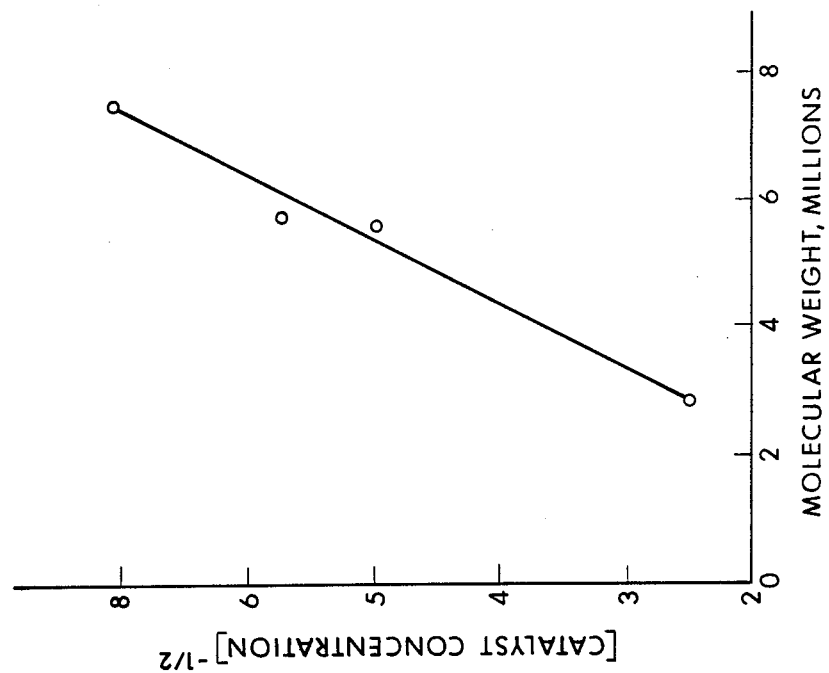
FIG. 2 is a graphical representation showing the linear relationship between the molecular weight of a polymer prepared by the process of this invention and polymerization catalyst concentration.

By way of illustration, a monomer such as acrylamide, which may be in the form of a solid, or a commercially available 50%, by weight, $Cu^{++}$ inhibited aqueous solution, is introduced into the vessel 16 along with water from the source 12. If the monomer is in the form of an aqueous solution of the type mentioned, the solution advantageously is first passed through an ion exchange resin to remove $Cu^{++}$. The aqueous monomer solution in the vessel 16 will comprise about 6%, by weight, monomer and will have a pH in the range of from about 8 to about 10. The concentration of oxygen in the solution will be of the order of about 4 to 6 ppm. The monomer solution is heated to a temperature of about 40° C. to about 45° C. by means of the steam jacket 20. The heated monomer solution is then sparged with nitrogen until the oxygen concentration is reduced to a level of about 0.1 to about 0.2 ppm. Sparging rates are somewhat variable. Generally speaking, they should range from about 0.1 to 10, preferably 1 to 2 volumes of gas per volume of solution. Assuming for purposes of this illustration that a cocatalyst comprising sodium bisulfite and ammonium persulfate is employed, sodium bisulfite from the source 18 is first introduced into the vessel. The bisulfite acts as an oxygen scavenger, and augments the deoxygenation achieved with the nitrogen gas. Ammonium persulfate from the source 18 is then added to the reaction mixture. The concentration of the components of the cocatalyst will be about 180 ppm of the bisulfite and about 400 ppm of the persulfate, based upon the weight of the acrylamide monomer. The concentration, of course, can be varied as pointed out above to provide a polymer having the desired average molecular weight and molecular weight distribution. The relationship of catalyst to the molecular weight of the polymer is graphically depicted in FIG. 2 of the drawings. As shown, the average molecular weight of a polymer is a linear function of the inverse square root of the concentration of the catalyst. Thus, by selecting the appropriate catalyst level, it is possible with the process and system of this invention to prepare at the point of use a polymer having a desired average molecular weight, and one which, as stated, will be capable of meeting the performance demands of the reservoir. Following addition of the cocatalyst, the mixture in the vessel 16 is allowed to react for from 8 to 12 hours. The reaction exotherms until a temperature of from about 55° C. to about 60° C. is reached. The reaction mixture is stirred for approximately 2 to 3 hours while at this temperature. The 6% polymerized solution is thereafter pumped from the vessel 16 and mixed with a 50% solution of sodium hydroxide from the source 26. The rate of feed of the aqueous caustic is such that about 0.3 mole of the hydroxide is admixed with about 1 mole of the polyacrylamide, that is, sufficient caustic is introduced to hydrolyze approximately 30% of the amide groups comprising the polymer. From the mixing valve 24, the polymer solution is conveyed to the static mixers 28. No thinning or degradation of the polymer due to shear forces occurs in mixers 28, or in the subsequent dilutions of the polymer. From the mixers 28, the partially hydrolyzed polymer solution is transferred to the vessel 30 where it is mixed with fresh water from the source 12 to form about a 1%, by weight, aqueous solution of the partially hydrolyzed polyacrylamide. The solution remains in the vessel 30 for about 10 to about 12 hours, and is then transferred by means of the pump 32 to the dilution mixer 34 to provide an aqueous solution containing about 50 to about 5,000 parts per million, of partially hydrolyzed polyacrylamide. From the mixer 34, the diluted solution can be injected directly into an input well, or it can be transferred temporarily to a storage holding tank where it will be ready for injection into an input well.

The process and system of this invention, as mentioned above, enables the on-site preparation of polymers having a selectively controllable spectrum of molecular weights whereby a polymer can be customized, or tailor-made, to meet the permeability demands of substantially any reservoir of interest. More specifically, the process and system of the present invention enables the preparation of polymers, epecially polymers such as partially hydrolyzed polyacrylamide, having a selectively controllable average molecular weight and a molecular weight distribution such that a quantitative correlation can be made between those parameters and the injectivity and mobility behavior of the polymer in a reservoir. The relationship of these parameters, that is, average molecular weight and reciprocal relative mobility (RRM) is graphically depicted in FIG. 3 of the drawings. The RRM of a partially hydrolyzed polyacrylamide is shown as a linear function of the average molecular weight, and this relationship provides a valuable tool in customizing, or tailor-making, a polymer to meet the performance demands of a formation. A unique adjunct to the process and system is the use of a disc flooding technique which enables the reciprocal relative mobilities not only of the polymers prepared by the process of this invention, but also, the mobilities of drive fluids such as micellar dispersions, to be ascertained with statistically significant accuracy at substantially any given distance from the injection site. This information provides a high degree of predictability of the performance of the polymer and/or fluid in a particular reservoir, and results in optimum oil recovery.

By way of background, it is known that the reduction of the mobility of a fluid in a porous media such as an oil-bearing reservoir can be accomplished by increasing the viscosity of the fluid, decreasing the permeability of the porous media, or by a combination of both. Partially hydrolyzed polyacrylamides both increase the viscosity of water and reduce the permeability of a reservoir as their solutions flow through it. The extent to which a particular concentration of a given partially hydrolyzed polyacrylamide performs these two functions is very roughly a function of the polymer's average molecular weight. The viscosity, at low shear, and the screen factor of the polymer are simply bench-top techniques needed for comparing average molecular weights and are routinely used for quality control. The screen factor measurement is related to the permeability reduction capabilities of the partially hydrolyzed polyacrylamide.

A sample of a polymer having a higher molecular weight will give a higher viscosity and screen factor than a lower average molecular weight sample at the same concentration. Conversely, a higher molecular weight sample will require lower concentrations to provide the same viscosity and screen factor. It is reasonable to conclude from this that the higher molecular weight polymers should be more efficient. However, this is not the case in many instances. Thus, for example, where extremely large partially hydrolyzed polyacrylamide molecules are present, they may visually appear to go into solution but actually form gel-like systems which act as discrete particles. These particles are capable of, and do, in fact, filter out on the sand face or are entrapped in the first few centimeters of subsurface material and act to "plug" the wellbore. As a result, they substantially reduce injectivity of the polymer solution without contributing to mobility reduction further into the reservoir.

Generally speaking, the lower the permeability of the reservoir, the lower is the average molecular weight of the polymer which can be injected without significant wellbore plugging. For a given formation, however, it is entirely possible to have two partially hydrolyzed polyacrylamide solutions of the same average molecular weight which will exhibit radically different efficiencies for mobility control purposes. Where the molecular weight distribution of a polymer is relatively narrow, as is the case with the polymers produced in accordance with the process of this invention, substantially all of the polymer is effective in injectivity and mobility control. On the other hand, where the molecular weight distribution is broad, as in the case of most presently commercially available partially hydrolyzed polyacrylamides, the mobility is adversely affected by the lower molecular weight molecules in the polymer mixture, while the higher molecular weight molecules of the polymer indicate the presence of gel-like species that result in wellbore plugging.

It is reasonable to conclude from the foregoing discussion that the most significant polymer property is molecular weight. Polymers, especially man-made polymers, are complex mixtures of molecules of varying molecular weights. For this reason, the molecular weights of polymers are measured and reported as average molecular weights ($\overline{M}$). In theory, a number of methods are available for determining the average molecular weight of a polymer. Included among these methods are light scattering, gel permeation chromatography, electronmicroscopy, and ultracentrifugation, to name a few. In accordance with the preferred practice of this invention, ultracentrifugation is employed to obtain the average molecular weight characteristics of polymers produced by the process and system described above. In addition to enabling the measurement of the average molecular weight of a polymer, ultracentrifugation provides information which enables the calculation of the molecular weight distribution of the polymer. This is a significant measurement in that it provides information on the weighted range of the diverse molecular weight species comprising the polymer. An accurate knowledge of the average molecular weight and molecular weight distribution of a polymer species allows one to correlate not only the performance of a polymer in a porous media, but, also, polymer solution properties such as screen factor and Brookfield viscosity, with a fundamental and important polymer property, namely, molecular weight.

Basically, ultracentrifugation is a technique for measuring sedimentation rates. Analytical ultracentrifuges capable of providing such data are commercially available, excellent results being attainable with a Beckman Model E Analytical Ultracentrifuge. On the basis that a large mass (high molecular weight) sediments faster than a small mass (low molecular weight), as measured at the high angular velocities at which the ultracentrifuge operates, the average molecular weight ($\overline{M}$) of a polymer can be calculated from the sedimentation data provided by the ultracentrifuge utilizing a combination of the Svedberg equation (1), and the Flory-Mendelkern-Schrage equation (2). The equations are shown below:

$$\overline{M} = \left[\frac{S_0}{D_0}\right]\left[\frac{Kt}{1 - \overline{v}\rho_0}\right] \quad (1)$$

where:
$S_o$ is the sedimentation coefficient at infinite dilution
$D_o$ is the diffusion coefficient at infinite dilution
K is the gas constant
t is temperature
$\overline{v}$ is the polymer partial specific volume
$\rho_o$ is the solvent density $$\overline{M} = \left[\frac{S_0[\mu]^{\frac{1}{3}}\mu_0 N}{\beta(1 - \overline{v}\rho_0)}\right] \quad (2)$$

where:
$S_o$ is the sedimentation coefficient at infinite dilution
$[\mu]$ is the intrinsic viscosity
$\mu_o$ is the solvent viscosity in poise
$\rho_o$ is the solvent density
N is Avogadro's number
$\beta$ is a constant related to the polymer frictional coefficient
$\overline{v}$ is the polymer partial specific volume The quantities $S_o$ and $D_o$ in equation (1) are obtained by plotting the sedimentation and diffusion coefficient data obtained from the ultracentrifuge against the concentration of the polymer under investigation, and then extrapolating the essentially linear relationship of these parameters to infinite dilution to get $S_o$ and $D_o$. The parameter $\overline{v}$, that is, the polymer partial specific volume, cannot be evaluated experimentally by the usual pycnometric method because viscosity precludes preparation of sufficiently concentrated solutions. Therefore, the value of $\overline{v}$ is determined using a sophisticated densitometer (Mettler DMA 55) which allows the measurement of high visocosity solutions. The $\beta$ constant for numerous polymers other than partially hydrolyzed polyacrylamides are available. A suitable model was chosen from these to get a close approximation of this parameter. Single strand DNA provides an excellent model since it is of comparable molecular weight, is linear, and has pendant charged groups. The $\beta$ constant for DNA is $2.51 \times 10^6$, and this is the value used in making the calculations from the data obtained from the ultracentrifuge.

In addition to providing data for measuring the average molecular weight of a polymer species, ultracentrifugation provides information for the calculation of molecular weight distribution of a polymer species. As stated, this is highly useful measurement in that it provides important knowledge with regard to the weighted range of the varied molecular weight characteristics of a polymer species. For any given polymer species, the optics of the ultracentrifuge generate a pattern, which is registered refractometrically, representing the concentration gradient of the polymer versus the distance from the center of rotation. The gradient curves thusly generated are transformed directly into a distribution of sedimentation coefficients which can be converted to a distribution in molecular weight. A quantitative measure of the molecular weight distribution is obtained by taking the moments of the distribution curves generated by the optics of the ultracentrifuge and determining the standard deviation of molecular weight of abundance for a particular molecular species present in a selected polymer sample. This value is represented by the symbol $\sigma$ (sigma). Since the molecular weight distribution is dependent upon the average molecular weight of the polymer, the relative width or spread of the molecular weight distribution of the polymer is determined by dividing the value obtained for $\sigma$ from the distribution curves by the average molecular weight ($\overline{M}$) of the polymer.

The foregoing calculations can be made for a large number of polymer species prepared by the process of this invention to provide a meaningful correlation between the average molecular weight of a polymer and its mobility. This relationship is shown graphically in FIG. 3 of the drawings to which reference has been made above.

The generally optimum objectives of the present invention are met with partially hydrolyzed polyacrylamides having an average molecular weight ($\overline{M}$) in the range of from about 2 to about 10 million, preferably from about 4 to about 7 million, and a molecular weight distribution, as obtained by the relationship $\sigma/\overline{M}$, of from about 0.02 to about 0.22. The reciprocal relative mobility (RRM) of the polymer at the aforesaid average molecular weight range will be in the range of from about 1 cp to about 1000 cp.

As stated previously hereinabove, an important aspect of providing a polymer solution of predictable properties which is customized, or tailor-made, to meet the specific demands of a reservoir of interest, is the unique core or disc flooding technique of the present invention. The techniques enables the mobility behavior of a polymer, both at the wellbore and in the matrix of a formation, to be predicted with an appreciable degree of accuracy. The information thus provided can be used to alter the processing parameters employed in the system as described above to provide a partially hydrolyzed polyacrylamide solution capable of meeting the demands of a formation at the point of use to enable optimum recovery of oil to be attained.

The data obtained from the core or disc flooding technique of the invention to achieve optimization of polymer flooding includes (1) oil recovery, (2) mobility behavior, and (3) polymer retention. Oil recovery is measured as a function of injection volume by incremental produced fluid sampling throughout the flooding operation. Mobility data is calculated from pressure drop data continuously monitored over the span of the flooding operation. Polymer retention is determined by material balance on injected and produced polymer in the aqueous phase.

The effectiveness of polymer flooding is determined with the core or disc flooding technique by comparing oil recovery efficiency of the polymer flood to that of water flooding. Polymer flooding may be applied at any time in an oil reservoir's life, that is, immediately after primary production in lieu of water flooding (secondary polymer flood), or it can, and is more likely to, be applied later in a reservoir's life after secondary water flooding (tertiary polymer flood). The core or disc flooding technique of this invention is utilized to optimize polymer flooding for both secondary and tertiary flooding practices. Incremental polymer flood oil recovery, that is, the volume of oil recovered from the core or disc sample in excess of that recovered by water flooding, is determined. In a tertiary flood, the core or disc is (1) restored to initial oil saturation by injection of crude oil from the reservoir, (2) water flooded (generally 2 PV of water is injected), and (3) polymer flooded (generally 2 PV of polymer solution plus drive water is injected). Incremental polymer flood oil recovery is the amount obtained in Step 3. In a secondary flood the core or disc is (1) restored to initial oil saturation by crude oil injection, (2) water flooded, (3) restored back to initial oil saturation by crude oil injection, and (4) polymer flooded. Incremental polymer flood oil recovery is that obtained in Step 4 less that obtained in Step 2.

Typically, incremental polymer flood oil recovery ranges from about 2% PV to about 15% PV. Incremental oil recovery preferably is at least 2% PV in order to be significant, and advantageously is 5% PV, or greater. The actual volume (measured in milliliters) of incremental oil produced is related to the disc pore volume. The pore volume of a particular core or disc is dependent upon its dimensions (height and diameter) and porosity.

Figure 5:
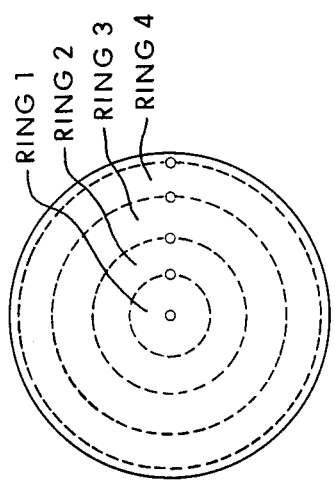
FIG. 5 is a schematic representation of a radical disc core obtained from an oil-bearing formation for use in determining the reciprocal relative mobility of a polymer of this invention at and away from the input well.

In carrying out the core or disc flooding technique, a core or disc sample is taken from anywhere in the area of the reservoir of interest. The disc may be either oil wet and/or water wet representing a spectrum of oil saturation. The disc sample normally will measure about 5 to about 6 inches in diameter and will be about 2 inches in height. An approximately ⅛ inch bore is made in the center of the disc for injecting fluids. The disc is separated into a number of concentric rings by means of pressure taps located along a radius. The pressure taps are in contact with the upper disc surface only. A schematic diagram of a typical disc is shown in FIG. 5 of the drawings. The disc is enclosed in a holder which, in sharp contrast to conventional top-to-bottom, or lengthwise, core test procedures, only permits flows of fluids to take place laterally, or radially, from the center of the disc to the outer wall of the disc, a condition which more closely emulates the flow characteristics of a fluid injected into a reservoir. Mobility behavior calculated from pressure drop data is continuously monitored throughout the span of the disc flood. Reciprocal relative mobility (RRM), is calculated from Darcy's equation (3)

$$\lambda_r^{-1} = \frac{Kh(\Delta p)}{Q \ln \frac{r_0}{r_1}} \quad (3)$$

is only dependent upon pressure drop ($\Delta p$) since permeability (K), height (h), flowrate (Q) and inner ($r_1$) and outer ($r_o$) radii are constant for each disc flood. Pressure drops are larger near the center wellbore due to larger $r_o/r_1$ ratios. Absolute values of pressure drops during polymer injection are dependent upon the K constant in Equation 3 and effective viscosities times permeability reduction.

The optimum configuration for a polymer is determined by conducting disc floods wherein both the concentration and volume of polymer injected are varied and polymer flood incremental oil is measured. The optimum dosage (concentration times pore volume) is that which gives near maximum incremental oil recovery (i.e., where increased polymer dosages give very little additional incremental oil recovery). The optimum configurations of other polymers differing in molecular weight are determined in a similar manner. Lower concentrations are required to obtain maximum incremental oil recovery with increasing molecular weight polymers.

Polymer mobility and retention data are useful in selecting the optimum molecular weight. Preferably polymer retention should be less than about 200 lb/AF (Acre Foot), and most advantageously less than 100 lb/AF. It is desirable that the maximum produced polymer concentration be greater than about 50% of the injected concentration to effect water mobility reduction and incremental oil recovery at appreciable distances from the injection or input wellbore. In instances where polymer retention is very high, that is, above about 500 lb/AF, polymer flooding is probably uneconomical. The subterranean rock composition is the dominant factor controlling polymer retention. Other factors affecting retention, although to a somewhat lesser degree, are polymer type and water salinity, both of which can be controlled by the process and core or disc flooding technique of this invention.

The mobility data obtained by the disc flooding technique is extremely useful in optimizing polymer molecular weight. Injectivity is also an important economic factor. Injectivity is inversely proportional to the total reciprocal relative mobility of a polymer. Reciprocal relative mobility increases and injectivity decreases with increasing polymer molecular weight. Generally speaking, the following criteria are employed in selecting a polymer of optimum molecular weight: (1) the reciprocal relative mobility of the polymer should be about 3 to about 10 times greater than that of water, (2) the reciprocal relative mobility of the drive water following the polymer flood should be less than a factor of about 5 times greater than that of water prior to polymer injection, and (3) during polymer flow the reciprocal relative mobility in ring 1 of the disc should be lower than those in the outer disc rings. Polymers with higher molecular weights which may affect maximum incremental oil recovery at lower polymer concentrations are not economically optimum due to their reduced injectivity. The third mobility characteristic listed above is unique to partially hydrolyzed polyacrylamides prepared in accordance with the teachings of this invention. Commercial polymers generally cause the highest reciprocal relative mobilities in ring 1 of the disc due to excessive near wellbore plugging. This is extremely undesirable since total reciprocal relative mobility, and, hence, injectivity is dominated by the near wellbore behavior in a radial system. These fundamental differences in the polymers of the present invention and commercial polymers will be expanded upon later in the description.

By way of illustration, a disc sample was obtained from an oil-bearing formation in a Western reserve where water flooding had been carried out. The disc had a radius of 6.20 cm and a height of 4.76 cm. A ⅛ inch wellbore was drilled in the center of the disc, and the disc was purged of residual fluids with a suitable solvent. Following drying, the disc was enclosed in a holder having internal dimensions slightly larger than the outer dimensions of the disc, and pressure taps were inserted in openings in the cover of the holder along a radius thereof to divide the disc into four concentric rings as shown in FIG. 5. The dry disc was then saturated, by injection through the ⅛ inch wellbore, with formation water, to determine the permeability characteristics of the disc using Equation 3. The core or disc pore volume was found to be 146.2 cc, and the porosity of the disc was 25.4%. The residual oil saturation of the disc was 68.4% PV. The water saturation was 31.6% PV. The disc was then saturated with crude oil from the reservoir from which the disc sample had been taken to duplicate as closely as possible in the disc the natural conditions of the reservoir. The viscosity of the crude oil was approximately 10 cp at 85° F. Following saturation with the crude, approximately 2 PV of water having a viscosity of 0.82 cp at 85° F. was injected into the disc until oil production ceased (100% water cut). The crude oil was collected through a tap in the disc holder at the outer edge or wall of the enclosed disc. The total volume of oil obtained was approximately 16.4 ml, or 11.22% PV. After the oil had been flushed from the disc with the water flood, 0.5 PV of a polymer solution prepared by the process of this invention was injected into the disc at a constant flow rate of 13 cc/hr. The concentration of the polymer in the solution was approximately 1000 ppm, and the average molecular weight and the molecular weight distribution of the polymer were 4 million and 0.15, respectively. The injected polymer solution was not screened or filtered in any manner. The viscosity of the solution was approximately 7.84 cp at 85° F. The polymer flood was immediately followed by a water drive. The volume of oil recovered by the polymer flood was 13.35 ml or 9.13% PV. The amount of polymer injected was 71.80 mg. The amount of polymer produced was 58.64 mg. The total polymer retained was 13.25 mg, giving a polymer loss due to retention of 63 lb/AF.

The pressure drop across the disc was continuously monitored. Thus, for rings 1, 2 and 3 during the water flood, the pressure drop for ring 1 ranged from an initial high of 1.32 psi to a low of 0.14 psi; for ring 2, from 0.75 psi to 0.10 psi; and for ring 3, from 0.13 psi to 0.02 psi. The total of the pressure drop across all of the rings is the sum of 0.14, 0.10 and 0.02 or 0.26 psi. During the polymer flood, the drop in pressure for ring 1 ranged from a high of 1.25 psi to a low of 0.74 psi; for ring 2, from 0.35 psi to 0.19 psi; and for ring 3, from 0.04 psi to 0.08 psi. The total drop in pressure was 1.01 psi. The corresponding figures for the polymer water drive were 0.14 psi to 0.05 psi for ring 1; 0.10 psi to 0.05 psi for ring 2; and 0.06 psi to 0 for ring 3. The total pressure drop for the water drive was 0.10 psi.

The reciprocal relative mobility of the polymer solution is equivalent to the viscosity term ($\lambda_4^{-1}$) of Equation 3 using the initial water permeability of the disc as K in the equation. Since the average molecular weight of the injected polymer solution is known from previously obtained ultracentrifuge data, the reciprocal relatively mobility of the polymer in the reservoir can be predicted. More than one polymer solution may have to be injected into the disc to determine the polymer solution best suited to meet the demands of the reservoir. However, this determination can be made quickly, and, certainly, more efficiently and far less expensively than conducting trial and error tests in the field. The overriding consideration is that the technique enables one to preselect a polymer solution capable of providing optimum performance at minimal concentration of the polymer without any concomitant face plugging at the injection well.

The core or disc flooding technique of this invention can also be used to advantage in the preselection of micellar flooding materials. Such materials are the subject matter of a number of United States patents including U.S. Pat. Nos. 3,266,570, 3,506,070, 3,682,247 and 3,734,185. Generally speaking, these materials comprise a dispersion consisting essentially of water, hydrocarbon and surfactant. Optionally, an electrolyte and/or cosurfactant can be added. The dispersions are classified as water-external or oil-external depending upon whether the hydrocarbon phase is internally dispersed or the water phase is internally dispersed. Also, the dispersions can be classified as intermediate where the external phase is not classically defined as either water-external or oil-external. In the usual case, the injection of about 1% to about 20% formation pore volume of a micellar dispersion provides efficient recovery of crude oil from oil-bearing formations. The nature of micellar dispersions is such that, especially from an economic standpoint, it is important to ascertain, before injection into a reservoir, the performance characteristics of the dispersion in a reservoir of interest. The core flooding procedure described above in relation to the polymer solutions produced by the process of this invention can be utilized to advantage to customize or tailor-make, so to speak, a micellar dispersion to satisfy the demands of substantially any reservoir where the use of such dispersions are feasible. The core flooding procedure determines the mobility profile of the dispersion. This property enables the dispersion to achieve optimum recovery of oil in the reservoirs. The viscosity can be readily changed for this purpose by adjusting the water content of the dispersion among other variables.

In using micellar dispersions in the secondary and tertiary recovery of oil, it is a preferred practice to follow the micellar dispersion slug with one or more mobility buffer slugs, the latter usually being followed by a water drive. U.S. Pat. No. 3,406,754 discloses a process where this practice is employed. The mobility profile of the micellar dispersions and the mobility buffers used in the process advantageously are graded from a low mobility equal to or less than the mobility of the formation fluids, that is, the crude oil and water within the formation, to a high mobility equal to or approaching that of the injected water drive. The mobility of the front, midportion, and back portion of the mobility buffer, or buffers, and, optionally, the micellar dispersion, should be designed to be compatible with the formation fluids as well as each preceding and following slug, including the water drive, used in the process to attain optimum displacement of oil and to avoid adverse effects on adjacent slugs due to fingering and/or leaching of the components comprising each slug. The process and system of the present invention as described above not only enable the micellar dispersion and mobility buffers to be designed to meet the performance demands of a reservoir of interest, but, also, provide for the on-site preparation of mobility buffers having optimum injectivity and mobility characteristics.

More specifically in this latter connection, the process and system of this invention enable the on-site preparation of mobility buffers of differing molecular weights, and, as pointed out above, differing reciprocal relative mobilities, such that the front, midportion and back portion of each slug will have optimal internal compatibility as well as optimal external compatibility with respect to the preceding and following slugs, including the micellar dispersion and the water drive, used in the oil recovery operation. This is achieved in accordance with the practice of this invention by selectively altering the concentration of the catalyst, or cocatalyst, used in effecting polymerization of the monomer employed.

Figure 4:
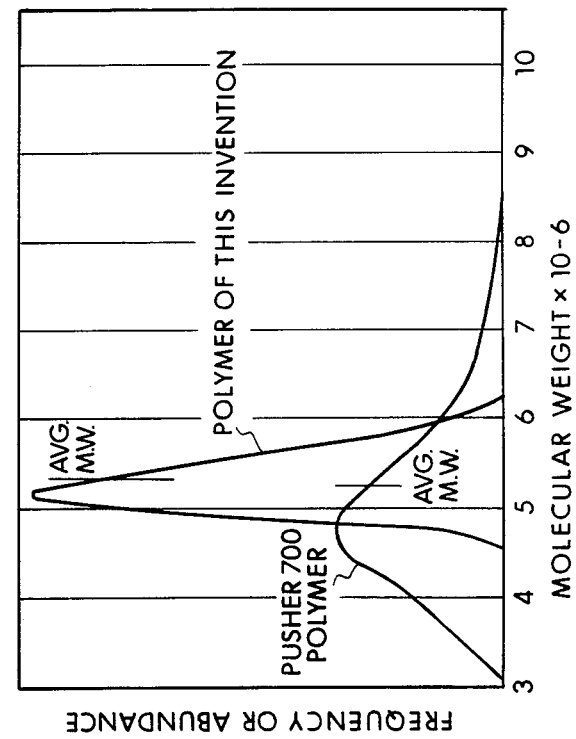
FIG. 4 is a graphical comparative representation of the molecular weight distribution of a polymer produced by the process of this invention and a commercial product.

In order to demonstrate the superior performance properties of the partially hydrolyzed polyacrylamide solutions prepared by the process and system of the present invention and a leading commercially available partially hydrolyzed polyacrylamide, namely, PUSHER 700 (Dow Chemical Company), comparative studies were carried out. FIG. 4 is a schematic graphic representation of molecular weight distribution curves obtained with a partially hydrolyzed polyacrylamide prepared by the process of this invention, and a sample of PUSHER 700 polymer. The polymer prepared by the process of this invention has an appreciably narrower molecular weight distribution devoid of the extreme low and high molecular weight species of the commercial product. The narrower molecular weight distribution of the polymer enables more efficient and uniform mobility control to be attained since substantially all of the polymer is effective in contributing to the mobility properties of an aqueous solution of the polymer. In the case of the PUSHER 700 polymer, the molecular weight distribution of the polymer is much broader, and the polymer contains an appreciable proportion of extremely large partially hydrolyzed polyacrylamide molecules indicative of the presence of gel-like species. Gel-like particles tend to filter out on the sand face, or are entrapped in the first few centimeters of sand, and act to "plug" the wellbore. Thus, they reduce injectivity without contributing to mobility control further into the matrix of a reservoir. Excessive plugging in the near wellbore region results in wanton loss of injectivity.

Figure 6:
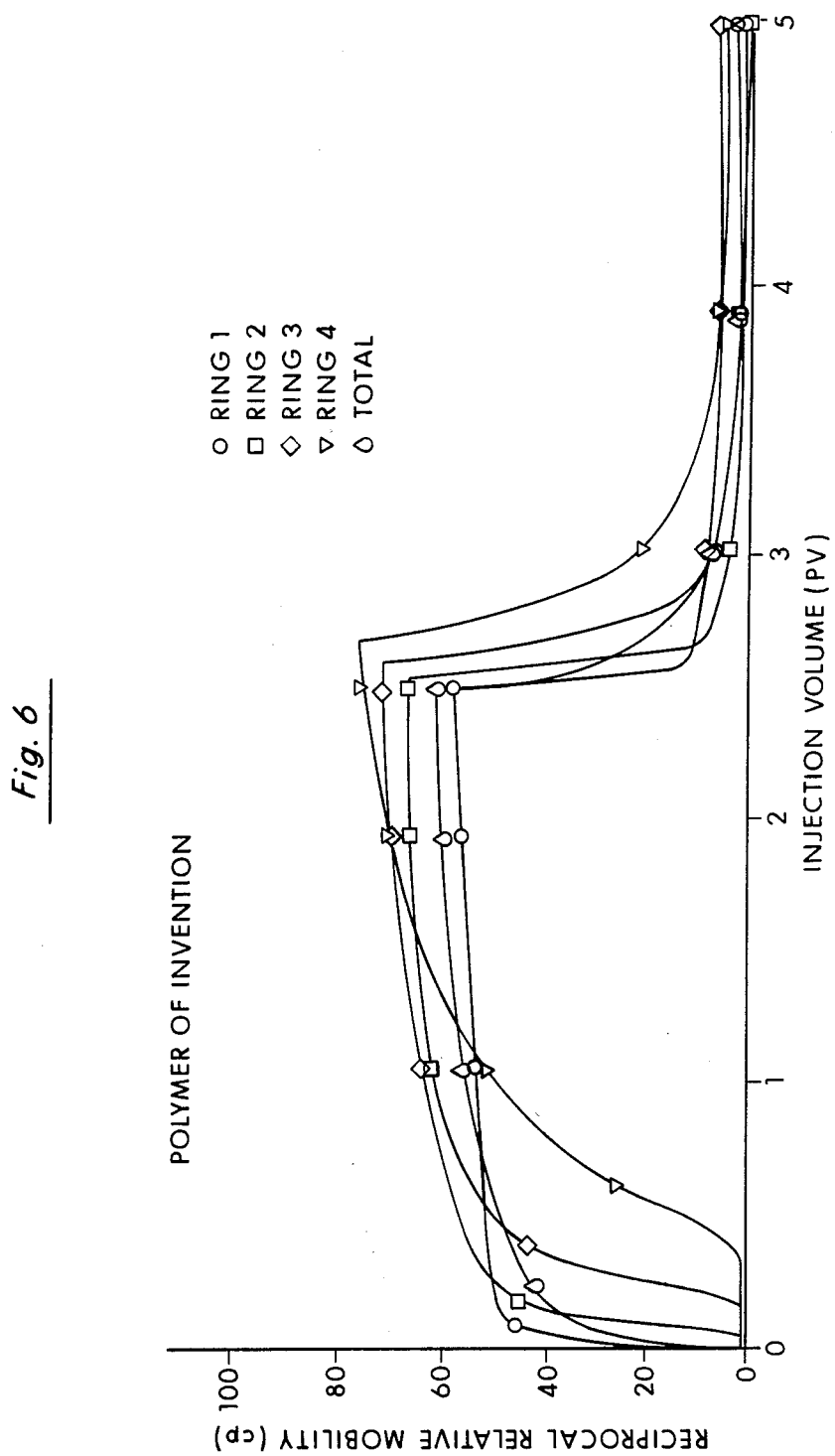
FIG. 6 is a graphical representation of the mobility of a polymer solution prepared by the process of this invention as a function of injection volume.
Figure 7:
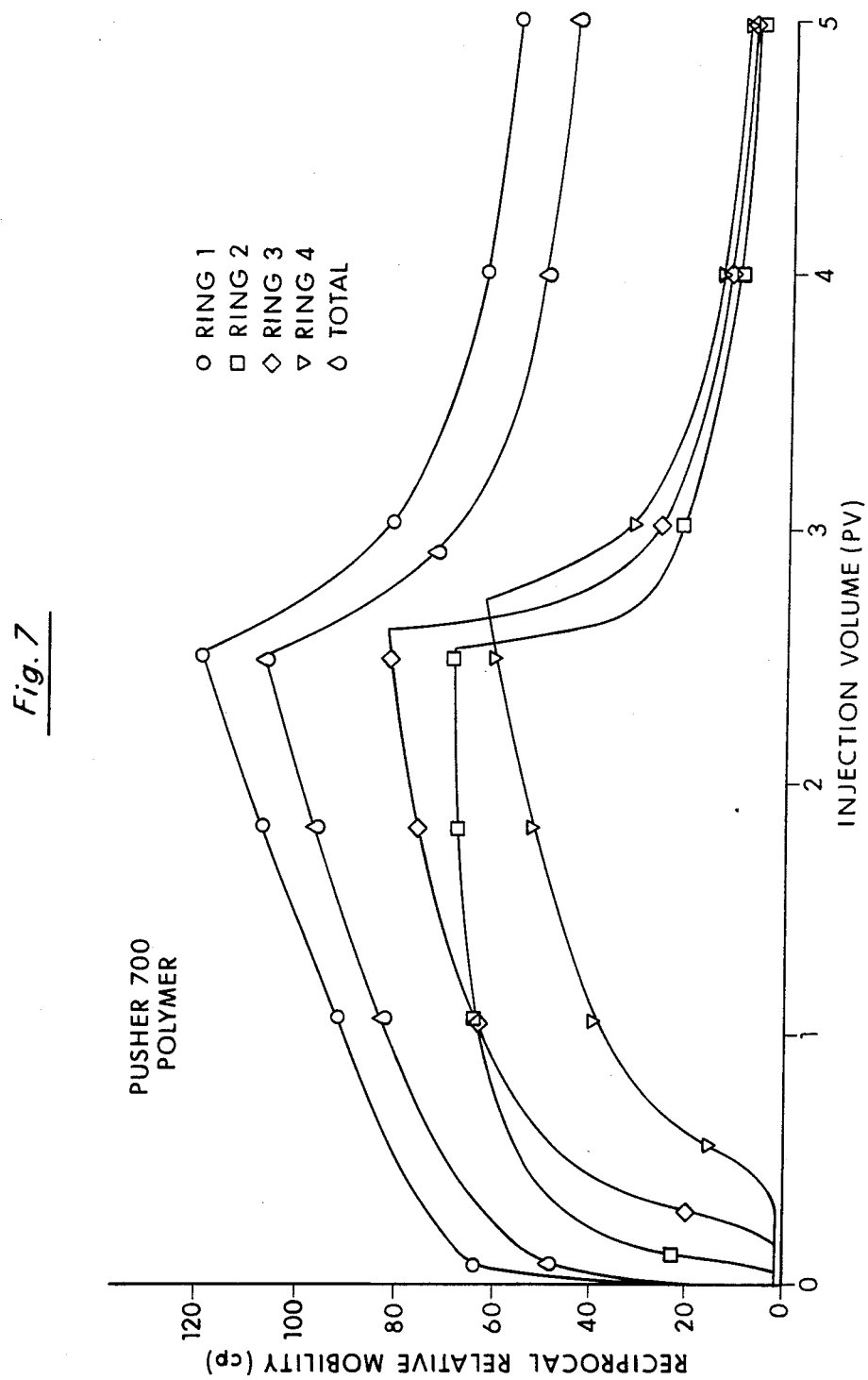
FIG. 7 is a graphical representation of the mobility of polymer solution prepared from a typical commercial polymer as a function of injection volume.

The sharp differences in the injectivity and mobility properties of a partially hydrolyzed polyacrylamide of this invention and the PUSHER 700 polymer product are depicted in FIGS. 6 and 7 of the drawings. The test results were obtained using multi-tapped fired Berea discs with 2.5 pore volume injection of 1000 ppm polymer in 500 ppm sodium chloride brine followed by 2.5 pore volume brine at an injection rate of approximately 0.0056 cc/sec. As shown in FIG. 6, the reciprocal relative mobility of the partially hydrolyzed polyacrylamide of the present invention increases with increasing radial distance. This is a result of relatively low and uniform permeability reduction including the near wellbore region (ring 1) and a high viscosity which increases with distance. As shown in FIG. 7, the mobility profile of the commercial product, PUSHER 700 polymer, is more complex. Initially reciprocal relative mobility decreases with radial distance. In this zone, permeability reduction dominates viscosity. Permeability reduction is extremely high at the wellbore region (ring 1) and decreases with distance, at which time it becomes constant at a comparatively low value. After permeability reduction becomes constant, the effects of relatively low, but increasing viscosity causes the reciprocal relative mobility to increase with distance. This comparative study shows that the polymer of this invention has an injectivity which is more than one and a half times higher than that of PUSHER 700 polymer. Further, the performance of the polymer of this invention has much higher efficacy in the matrix (distant from the wellbore region) than PUSHER 700 polymer, one of the leading commercial polymers.

Figure 8:
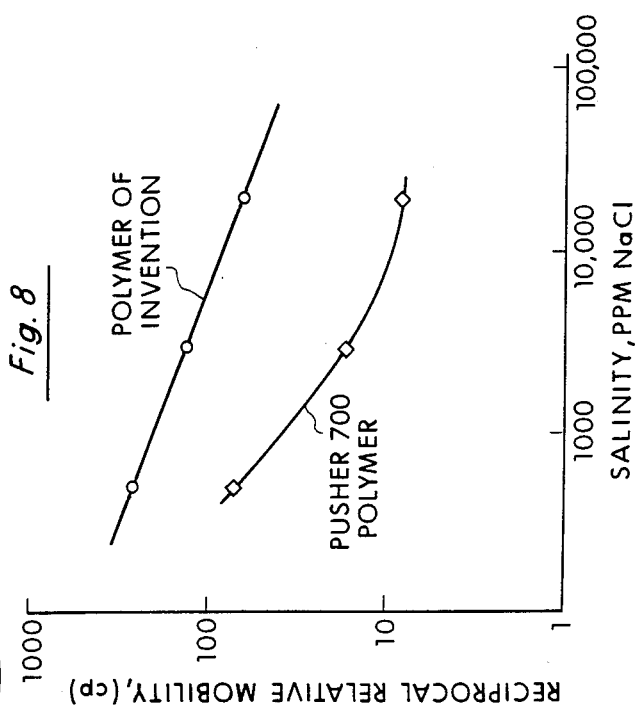
FIG. 8 is a comparative graphical representation showing the effect of salinity on the mobility of a polymer solution prepared by the process of this invention and on a commercial product.

In addition to their superior injectivity and mobility control properties, the partially hydrolyzed polyacrylamides of this invention also have a brine tolerance greater than that of conventional polyacrylamides such as PUSHER 700 polymer. The effect of salinity on the matrix reciprocal relative mobility of a polymer of the present invention and PUSHER 700 polymer is graphically portrayed in FIG. 8 of the drawings. The polymer of this invention shows a surprisingly and consistently higher tolerance for brine at all concentrations used.

To further establish the marked differences in properties between the polymers of this invention and commercial products such as PUSHER 700 polymer, shear tests were carried out under comparable conditions. Shear degradation, which manifests itself as a loss in screen factor and/or viscosity, of the polymer of the present invention was less than one-third the degradation of PUSHER 700 polymer.

A further significant property of the polymers of this invention over conventional partially hydrolyzed polyacrylamides is their excellent stability. Thus, by way of illustration, a polymer prepared approximately eight months prior to testing was stored, without preservatives, at approximately one percent concentration, without excluding dissolved oxygen, and exhibited no apparent degradation.

Certain modifications of the process and system of this invention will occur to those skilled in the art from a reading of the foregoing description. It should be understood that such description has been given by way of illustration and example and not by way of limitation. It is intended to include within the invention any such modifications as fall within the scope of the claims.

We claim:

1. A transportable system for the on-site, in-line, continuous preparation of an aqueous solution of a polymer capable of meeting the performance demands of a subterranean oil-bearing reservoir having located thereat at least one input well and at least one output well through which the oil in the reservoir is recovered comprising: reactor means for forming a polymer having a predetermined average molecular weight and molecular weight distribution; a catalyst source for enabling the selective introduction into the reactor means of a catalyst in an amount such that the formation of the polymer will be promoted and the average molecular weight and molecular weight distribution of the polymer can be selectively altered in a manner to provide a polymer having predetermined injectivity and mobility properties capable of satisfying the performance demands of the reservoir at which the system is located; a hydrolyzing agent source, including means for continuously feeding a controlled amount of a hydrolyzing agent into the polymer stream to effect partial hydrolyzation of the polymer; hydrolyzation reactor means; and dilution means in communication with the hydrolyzation reactor means for forming an aqueous solution containing a predetermined concentration of partially hydrolyzed polymer without disruption of the predetermined average molecular weight and molecular weight distribution properties of the polymer to provide an aqueous solution of partially hydrolyzed polymer capable of meeting the performance demands of a reservoir; said system being characterized in that the components thereof are interconnectable and capable of ready transport to any desired location at an oil-bearing reservoir of interest or to a different oil-bearing reservoir.

2. A system according to claim 1 wherein the catalyst source is capable of holding more than one polymerization catalyst to enable a single catalyst or a combination of catalysts to be selectively introduced into the reactor means.

3. A system according to claim 1 wherein mixing means in communication with the reactor means and the hydrolyzing agent source is provided for intimately contacting a preselected amount of a hydrolyzing agent with polymer from the reactor means.

4. A system according to claim 3 wherein said mixing means includes valve means in communication with the reactor means and the hydrolyzing agent source.

5. A system according to claim 3 wherein said mixing means includes at least one static mixture positioned upstream with relation to the hydrolyzation reactor means.

* * * * *

UNITED STATES PATENT AND TRADEMARK OFFICE
CERTIFICATE OF CORRECTION

PATENT NO. : 4,580,627
DATED : April 8, 1986
INVENTOR(S) : Perry A. Argabright and John S. Rhudy It is certified that error appears in the above-identified patent and that said Letters Patent are hereby corrected as shown below:

Abstract, line 20: Delete "tail-made" and insert --tailor-made--.
Col. 1, line 41: After "wells" and before "penetrating, insert --also--.
Col. 8, line 2: Delete "needed".
Col. 10, line 53: Delete "techniques" and insert --technique--.
Col. 11, line 59: Delete "flows" and insert --flow--.
Col. 14, line 4: Delete "$(\lambda_4^{-1})$" and insert --$(\lambda_r^{-1})$--.

Signed and Sealed this

Fifteenth Day of July 1986

[SEAL]

Attest:

DONALD J. QUIGG

Attesting Officer

Commissioner of Patents and Trademarks